No. 671,492. Patented Apr. 9, 1901.
H. REISERT.
APPARATUS FOR PURIFYING WATER.
(Application filed Feb. 19, 1900.)
(No Model.) 3 Sheets—Sheet 3.
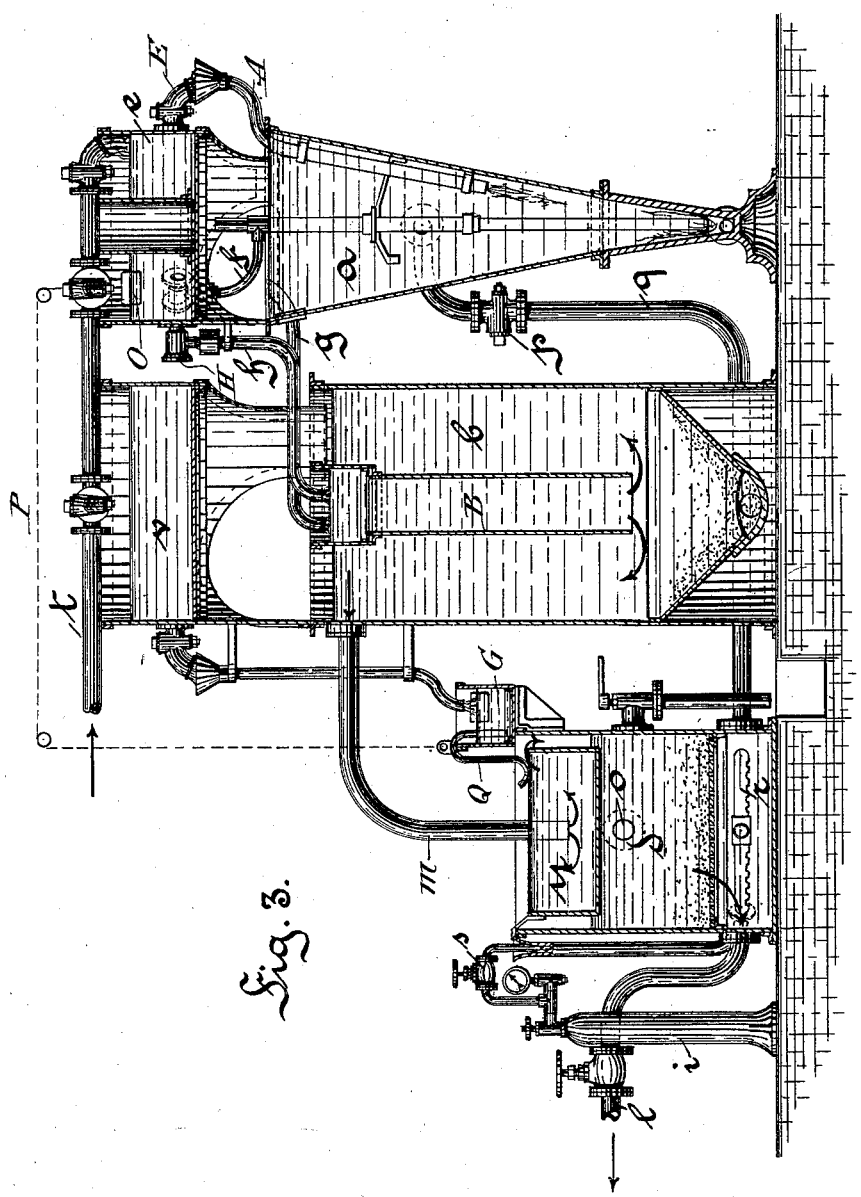

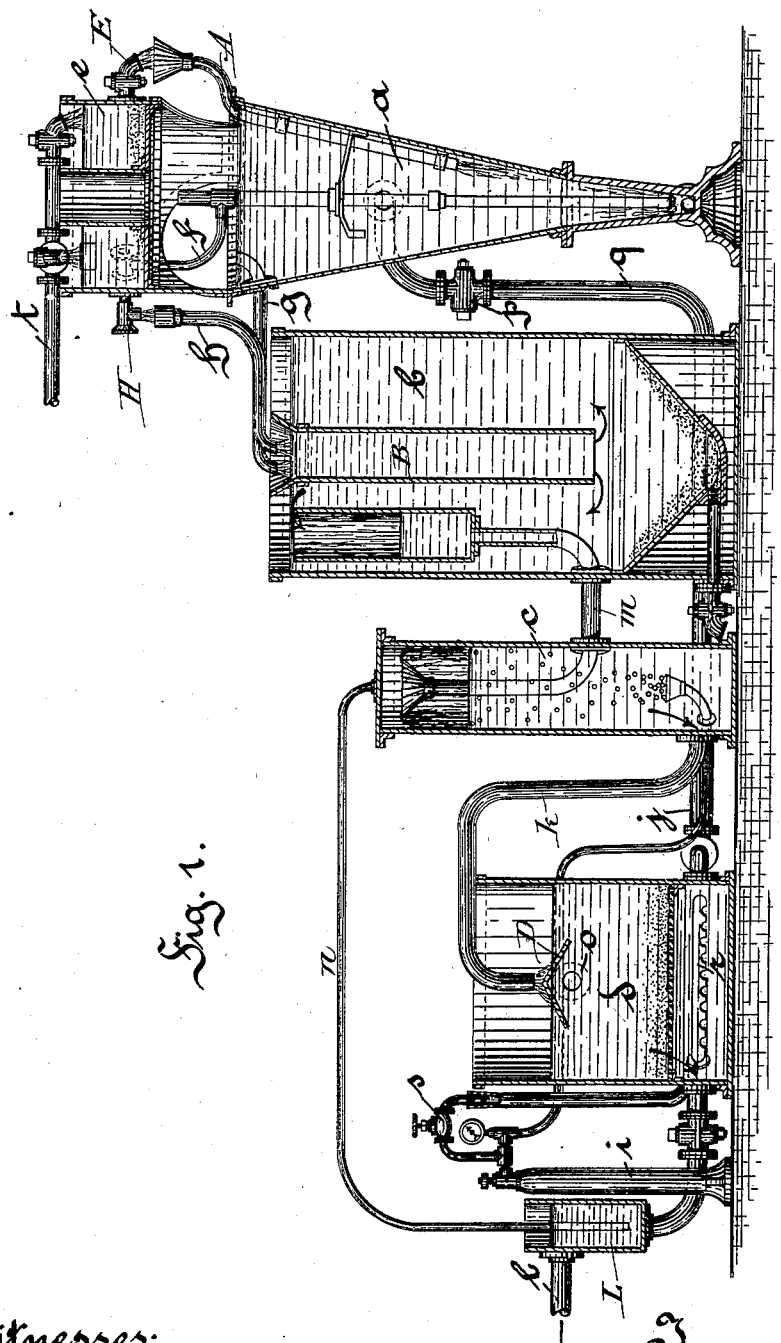

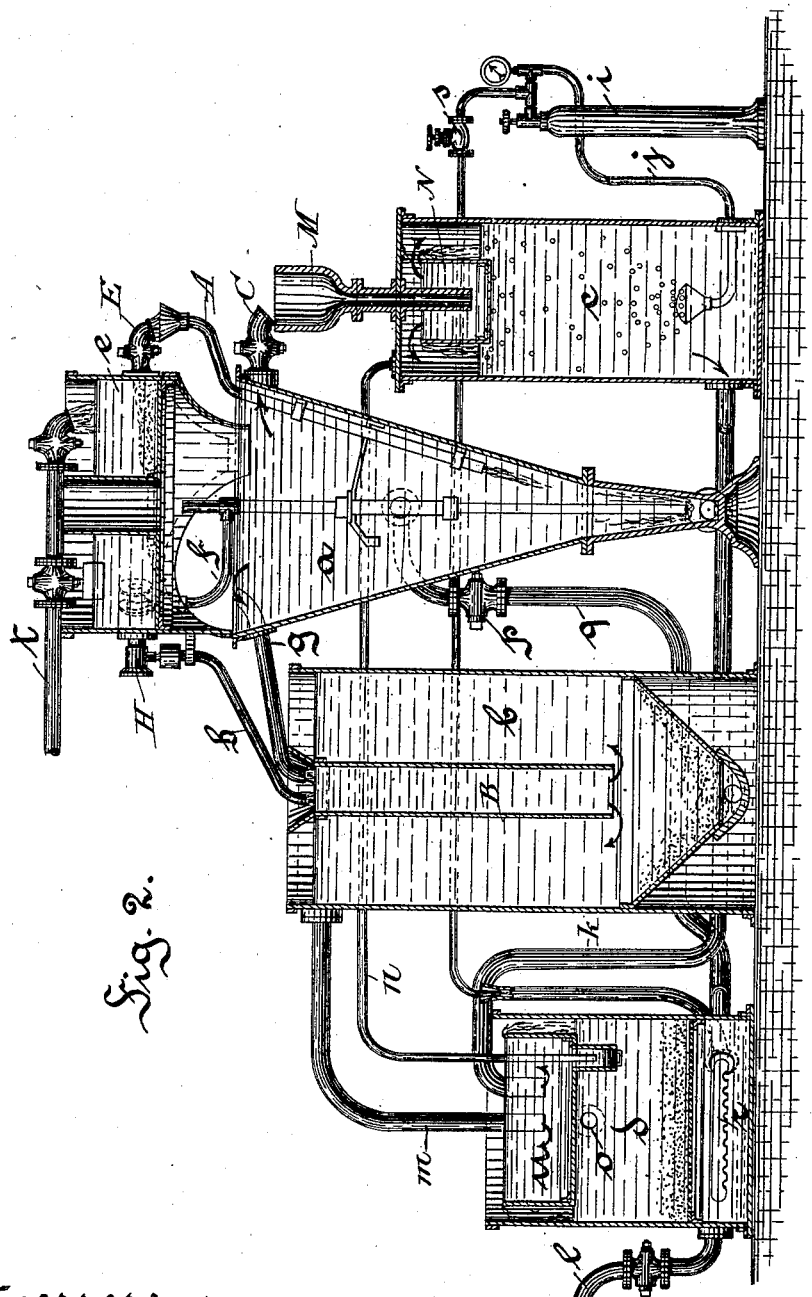

UNITED STATES PATENT OFFICE.

HANS REISERT, OF COLOGNE, GERMANY.

APPARATUS FOR PURIFYING WATER.

SPECIFICATION forming part of Letters Patent No. 671,492, dated April 9, 1901.

Application filed February 19, 1900. Serial No. 5,842. (No model.)

*To all whom it may concern:*

Be it known that I, HANS REISERT, a subject of the King of Prussia, German Emperor, and a resident of Cologne, in the Province of the Rhine, Kingdom of Prussia, German Empire, have invented new and useful Improvements in Apparatus for Purifying Water, of which the following is a specification.

My invention relates to improvements in the purification of water, especially drinkable water, and has for its object to provide an apparatus by means of which a clear drinkable water free of bacteria may be obtained.

It consists in a combination of apparatus constituting an installation which effects the purification under the following conditions: The water to be purified is at first mixed with lime-water in order to destroy the bacteria contained in the same. Thereafter the water is treated with carbonic anhydrid or other suitable chemical equivalent of the same by means of which hydrate of lime is transformed into carbonate of line, whereafter the water is cleansed by means of a filter in order to purify it from the foul and other impurities. The carbonate of lime contained in the water is retained in the filter material and forms in combination with the same an excellent filtering stuff. In order to prevent the bacteria which may still be contained in the water from multiplying in the filter material and at the same time to cleanse the filter material in case it is full of dirt, an arrangement is provided, by means of which the filter material can easily be cleansed and disinfected. The installation which I have devised for carrying out this method of treatment in the most favorable manner both from the technical point of view and from the economical point of view is represented in the accompanying drawings, in which—

Figure 1 represents a vertical section through the whole apparatus. Figs. 2 and 3 are modifications of the apparatus shown in Fig. 1.

The apparatus shown in Fig. 1 consists of a reservoir $a$, which contains in its lower part milk of lime and in which part of the water to be purified is saturated with hydrate of lime, a reservoir $b$, in which lime-water is mixed with the water to be purified and in which the bacteria contained in the water are destroyed by the hydrate of lime, an apparatus $c$, in which the hydrate of lime is neutralized—that is to say, transformed into carbonate of lime— and a filter $d$, provided with an arrangement for cleansing and disinfecting the same. The effect of the apparatus is as follows: The water to be purified enters the apparatus through the pipe $t$, through which it flows into the reservoir $e$. From this reservoir $e$ a certain quantity of the water, which quantity is regulated by means of the valve E, flows through the pipe A into the funnel-shaped reservoir $a$, which reservoir contains in its lower part hydrate of lime. In order to saturate this water entering the reservoir $a$ with the hydrate of lime, a pipe $f$ is provided, which leads from the reservoir $e$ nearly to the bottom of the reservoir $a$. The water flowing through this pipe stirs the hydrate of lime up and causes the same to be more quickly dissolved in the water. After having been saturated with hydrate of lime the water flows through the pipe $g$ on the top of the reservoir $a$ into the reservoir $b$, where it is mixed with water flowing into the same from the reservoir $e$ through the pipe $h$. The quantity of this water is regulated by means of the valve H. In order to attain a more thorough mixture of the water with the lime-water, a pipe B is provided, through which the mixture flows downward, whereafter it must flow upward again in order to leave the reservoir $b$ through the pipe $m$. In the meantime the bacteria contained in the water are entirely destroyed by the effect of the lime-water. The pipe $m$, through which the water leaves the reservoir $b$, leads the same into the air-tight reservoir $c$, while at the same time carbonic anhydrid is led from a bottle $i$, filled with liquid carbonic anhydrid, through the pipe $j$ in a reverse direction into this reservoir $c$. In order to regulate the pressure of the carbonic anhydrid, the pipe $m$ is U-shaped, so that as soon as the pressure is too high the water rises in that part of pipe $m$ which is situated in the reservoir $b$. The more this water rises the more counter-pressure it exercises, so that the pressure of the carbonic anhydrid, and herewith naturally the quantity of carbonic anhydrid, entering the reservoir $c$ is regulated. This regulation of the pressure can naturally only be effective to a certain degree.

In case the pressure is too high it must be regulated by means of the valve J of the bottle $i$. In order to be able to know whether the pressure of the carbonic anhydrid is too high, a pipe $n$ is provided at the top of the reservoir $c$, which pipe leads into the reservoir L, filled to a certain point with water. If now the pressure in the reservoir $c$ is too high, the carbonic anhydrid will leave the same through the pipe $n$, which can instantly be seen, and is a sign that the valve J must be closed a little more. In the reservoir $c$ the carbonic anhydrid transforms the hydrate of lime $Ca(HO)_2$ into carbonate of lime $(CaCO_3,)$ which is insoluble in water. In order to cleanse the water from other impurities, it is brought thereafter into the filter $d$ through the pipe $k$. In this filter $d$ a deflecting-plate D is provided in order to cause the water to flow in more quietly, so that the insoluble carbonate of lime decants and enters into the filtering stuff. Thereby it is possible that a rough filtering stuff can be used, which is greatly improved by the carbonate of lime entering into the same, which is very well fitted for the filtration of drinkable water. After passing the filter the water flows off through the pipe $l$. In order to cleanse the filter material in case it is full of dirt, the valve $o$, situated in the room above the filter material, is opened. At the same time a valve $p$, situated in a pipe $q$, leading from the reservoir $a$ to the room under the filter material, is opened, so that lime-water from the reservoir $a$ flows through the filter material in a reverse direction, whereby, first, the filter material is cleansed, and, second, the bacteria which may have gathered in the filter material are destroyed. In order to effect a more thorough cleansing of the filter material, a perforated pipe $r$ is provided, through which as soon as the valve $s$ is opened a stream of carbonic anhydrid is forced through the filter material. As soon as the valve $p$ is closed again the hydrate of lime still contained in the filter material is transformed into carbonate of lime by means of carbonic anhydrid still entering the filter through the pipe $r$, so that the water in the filter will be perfectly clear. After closing the valves $s$ and $o$ the whole apparatus is again ready for use.

The apparatus shown in Fig. 2 differs from the apparatus shown in Fig. 1 only in so far as bicarbonate of lime is used for neutralizing the hydrate of lime. For this purpose the water to be cleansed does not flow through the reservoir $c$. In this construction the reservoir $c$ serves only for manufacturing bicarbonate of lime. For this purpose a small quantity of lime-water, which quantity is regulated by means of the valve C, is led through the funnel M into the reservoir $c$—that is to say, into a small reservoir N, provided in this reservoir $c$, which reservoir N has the purpose to effect an air-tight closing of the reservoir $c$. At the bottom of the reservoir $c$ enters the pipe $j$, through which so much carbonic anhydrid is led into the mlie-water as is necessary for transforming the hydrate of lime $Ca(HO)_2$ into bicarbonate of lime $Ca(HCO_3)_2$. The bicarbonate of lime is led then through the pipe $k$ into the reservoir $u$ above the filter material. Into this reservoir flows at the same time the water from the reservoir $b$ through the pipe $m$. The two fluid streams are mixed now and the bicarbonate of lime transfers the hydrate of lime into carbonate of lime, which is insoluble, as stated before. Otherwise the effect and construction of the apparatus are the same as of that shown in Fig. 1.

The construction shown in Fig. 3 differs from the construction shown in Figs. 1 and 2 only in that way that bicarbonate of soda is used for neutralizing the hydrate of lime. For this purpose a reservoir $v$ is provided, which contains a solution of bicarbonate of of soda, which in the same way as in the construction shown in Fig. 2 is led into the reservoir $u$. The supply of the solution of bicarbonate of soda is regulated by means of a float O, provided in the reservoir $e$. This float O is connected by means of a chain P with a siphon Q, situated in a small reservoir G, provided above the filter. The more water enters the apparatus the more rises the float O and the deeper the siphon Q goes into the solution contained in the reservoir G. Now the deeper the siphon goes into the solution the more solution flows through the same, so that the supply of bicarbonate of soda is regulated according to the quantity of water passing through the apparatus. The effect of the apparatus, as well as the cleansing of the filter material, is the same as in the apparatus shown in Figs. 1 and 2.

What I claim as my invention, and desire to secure by Letters Patent of the United States, is—

1. In an apparatus for purifying water the combination of a reservoir $e$ for the water to be purified, a reservoir $a$ containing in its lower part milk of lime, means for leading part of the water to be purified through the reservoir $a$ in order to saturate the water with hydrate of lime, a reservoir $b$ for mixing the water to be purified with the lime-water and a reservoir $c$ for neutralizing the mixture, with a filter $d$, provided with means for leading lime-water and carbonic anhydrid through the filter material, as and for the purpose set forth.

2. In an apparatus for purifying water the combination of a reservoir $e$ for the water to be purified, a reservoir $a$ containing in its lower part milk of lime, means for leading part of the water to be purified through the reservoir $a$ in order to saturate the water with hydrate of lime, a reservoir $b$ for mixing the water to be purified with the lime-water and a reservoir $c$, provided with means for leading carbonic anhydrid into the same, with a filter $d$, provided with means for leading lime-water and carbonic anhydrid through the filter material, as and for the purpose set forth.

3. In an apparatus for purifying water the combination of a reservoir $e$ for the water to be purified, a reservoir $a$ containing in its lower part milk of lime, means for leading part of the water to be purified through the reservoir $a$ in order to saturate the water with hydrate of lime, a reservoir $b$ for mixing the water to be purified with the lime-water and a reservoir $c$, provided with means for leading carbonic anhydrid and lime-water into the same, with a filter $d$, provided with means for leading lime-water and carbonic anhydrid through the filter material as and for the purpose set forth.

In testimony whereof I have signed my name to this specification in the presence of two subscribing witnesses.

HANS REISERT.

Witnesses:
KARL SCHMITT,
F. E. MALLETT.